United States Patent
Suto

(10) Patent No.: US 10,848,700 B2
(45) Date of Patent: Nov. 24, 2020

(54) IMAGING DEVICE WITH SWITCH CIRCUIT

(71) Applicant: Sony Semiconductor Solutions Corporation, Kanagawa (JP)

(72) Inventor: Hiroki Suto, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 16/344,592

(22) PCT Filed: Oct. 25, 2017

(86) PCT No.: PCT/JP2017/038422
§ 371 (c)(1),
(2) Date: Apr. 24, 2019

(87) PCT Pub. No.: WO2018/084031
PCT Pub. Date: May 11, 2018

(65) Prior Publication Data
US 2020/0186739 A1    Jun. 11, 2020

(30) Foreign Application Priority Data

Nov. 7, 2016  (JP) ................................ 2016-217278

(51) Int. Cl.
*H04N 5/3745* (2011.01)
*H04N 5/369* (2011.01)

(52) U.S. Cl.
CPC ....... *H04N 5/37455* (2013.01); *H04N 5/3698* (2013.01); *H04N 5/379* (2018.08)

(58) Field of Classification Search
CPC ... H04N 5/37455; H04N 5/379; H04N 5/3698
See application file for complete search history.

(56) References Cited

U.S. PATENT DOCUMENTS

| | | |
|---|---|---|
| 2003/0058137 A1 | 3/2003 | Tsai |
| 2005/0195304 A1 | 9/2005 | Nitta et al. |
| 2012/0062772 A1 | 3/2012 | Osawa et al. |

(Continued)

FOREIGN PATENT DOCUMENTS

| | | | |
|---|---|---|---|
| JP | 2013-055589 A | 3/2013 | |
| WO | WO-2015133323 A1 * | 9/2015 | ............. H04N 5/347 |
| WO | WO 2016/121352 A1 | 8/2016 | |

OTHER PUBLICATIONS

International Search Report and Written Opinion dated Jun. 2, 2018 in connection with International Application No. PCT/JP2017/038422.

*Primary Examiner* — Jason A Flohre
(74) *Attorney, Agent, or Firm* — Wolf, Greenfield & Sacks, P.C.

(57) ABSTRACT

An imaging device includes a plurality of pixels arranged in rows and columns. The plurality of pixels include a first pixel and a second pixel. A first signal line is coupled to the first pixel. A second signal line is coupled to the second pixel. The imaging device includes first comparator and a second comparator displaced from the first comparator in a column direction. The imaging device includes a switch circuit configured to couple the first signal line to the first comparator and the second comparator, and couple the second signal line to the first comparator and the second comparator.

13 Claims, 8 Drawing Sheets

(56) References Cited

U.S. PATENT DOCUMENTS

| | | | |
|---|---|---|---|
| 2012/0119065 A1* | 5/2012 | Cieslinski | H04N 5/3658 |
| | | | 250/208.1 |
| 2012/0307120 A1 | 12/2012 | Ito et al. | |
| 2015/0062394 A1* | 3/2015 | Ikeda | H04N 5/347 |
| | | | 348/301 |
| 2017/0195603 A1* | 7/2017 | Kawazu | H04N 5/341 |
| 2017/0302869 A1 | 10/2017 | Ikuma et al. | |

* cited by examiner

IMAGING DEVICE WITH SWITCH CIRCUIT

TECHNICAL FIELD

The present disclosure relates to a solid-state imaging device, a control method, and an electronic apparatus, and more particularly to, a solid-state imaging device, a control method, and an electronic apparatus that are capable of suppressing deterioration in image quality in a low power consumption mode.

CROSS REFERENCE TO RELATED APPLICATIONS

This application claims the benefit under 35 U.S.C. § 371 as a U.S. National Stage Entry of International Application No. PCT/JP2017/038422, filed in the Japanese Patent Office as a Receiving Office on Oct. 25, 2017, which claims priority to Japanese Priority Patent Application JP 2016-217278 filed in the Japanese Patent Office on Nov. 7, 2016, each of which is hereby incorporated by reference in its entirety.

BACKGROUND ART

In the past, in electronic apparatuses having an imaging function, such as a digital still camera and a digital video camera, imaging devices such as a charge coupled device (CCD) or complementary metal oxide semiconductor (CMOS) image sensor have been used.

An imaging device includes pixels each including a photodiode (PD) for photoelectric conversion and a plurality of transistors in combination, and creates an image on the basis of image signals output from the respective pixels arranged on an image surface on which an image of a subject is formed. Further, the CMOS image sensor includes, for example, a column analog-to-digital converter (ADC) that performs AD conversion of image signals in parallel in each column of pixels. Thus, the CMOS image sensor can perform AD conversion of image signals at high speed.

Recently, imaging devices have been increasingly made highly functional, and imaging devices having various functions such as a high-speed imaging mode and a low power consumption mode have been developed.

For example, Patent Literature 1 discloses an imaging device that performs reading mode control corresponding to each of a mode 1 for achieving a dynamic range expansion, reduction in noise, and the like, a mode 2 for achieving high-speed read, and a mode 3 for achieving low power consumption.

CITATION LIST

Patent Literature

PTL 1: Japanese Patent Application Laid-open No. 2013-55589

SUMMARY OF INVENTION

Technical Problem

Incidentally, the imaging device disclosed in Patent Literature 1 described above is configured to capture images while always stopping use of one of two column ADCs in a low power consumption mode (mode 3). For that reason, as compared with images captured using all the column ADCs, in images captured in the low power consumption mode, variations or noise peculiar to the column ADC tend to be visible as vertical lines, and there arises a concern about deterioration in image quality.

The present disclosure has been made in view of the circumstances as described above and can suppress deterioration in image quality in a low power consumption mode.

Solution to Problem

According to an embodiment of the present disclosure, there is provided a solid-state imaging device including: a predetermined number of comparators that are provided in each column of a plurality of pixels arranged in a matrix and compare an image signal output from each of the pixels and a reference signal when the image signal is subjected to analog-to-digital (AD) conversion; and a switching unit that is capable of connecting the plurality of pixels of each column and all of the predetermined number of comparators to each other and switching between the comparators to which the image signals are to be supplied, both in a connection configuration in which the image signals output from the plurality of pixels arranged in each column are supplied in parallel to the predetermined number of comparators and in a connection configuration in which the image signals are successively supplied to any one of the predetermined number of comparators.

According to another embodiment of the present disclosure, there is provided a control method for a solid-state imaging device, the solid-state imaging device including a predetermined number of comparators that are provided in each column of a plurality of pixels arranged in a matrix and compare an image signal output from each of the pixels and a reference signal when the image signal is subjected to analog-to-digital (AD) conversion, and a switching unit that is capable of connecting the plurality of pixels of each column and all of the predetermined number of comparators to each other and switching between the comparators to which the image signals are to be supplied, both in a connection configuration in which the image signals output from the plurality of pixels arranged in each column are supplied in parallel to the predetermined number of comparators and in a connection configuration in which the image signals are successively supplied to any one of the predetermined number of comparators, the control method including controlling the switching unit to sequentially switch between the comparators to which the image signals are to be supplied, out of the predetermined number of comparators, for use in the AD conversion in a mode in which the image signals are successively subjected to the AD conversion.

According to still another embodiment of the present disclosure, there is provided an electronic apparatus including a solid-state imaging device, the solid-state imaging device including a predetermined number of comparators that are provided in each column of a plurality of pixels arranged in a matrix and compare an image signal output from each of the pixels and a reference signal when the image signal is subjected to analog-to-digital (AD) conversion, and a switching unit that is capable of connecting the plurality of pixels of each column and all of the predetermined number of comparators to each other and switching between the comparators to which the image signals are to be supplied, both in a connection configuration in which the image signals output from the plurality of pixels arranged in each column are supplied in parallel to the predetermined number of comparators and in a connection configuration in which the image signals are successively supplied to any one of the predetermined number of comparators.

In one embodiment of the present disclosure, a predetermined number of comparators that are provided in each column of a plurality of pixels arranged in a matrix compare an image signal output from each of the pixels and a reference signal when the image signal is subjected to analog-to-digital (AD) conversion. Further, a switching unit capable of connecting the plurality of pixels of each column and all of the predetermined number of comparators to each other switches between the comparators to which the image signals are to be supplied, both in a connection configuration in which the image signals output from the plurality of pixels arranged in each column are supplied in parallel to the predetermined number of comparators and in a connection configuration in which the image signals are successively supplied to any one of the predetermined number of comparators.

Some embodiments relate to imaging device, comprising: a plurality of pixels arranged in rows and columns, the plurality of pixels including a first pixel and a second pixel; a first signal line coupled to the first pixel; a second signal line coupled to the second pixel; a first comparator; a second comparator displaced from the first comparator in a column direction; and a switch circuit configured to couple the first signal line to the first comparator and the second comparator, and couple the second signal line to the first comparator and the second comparator.

The second pixel may be adjacent to the first pixel.

The first pixel may include a plurality of photoelectric conversion elements.

The second pixel may include a plurality of photoelectric conversion elements.

The first pixel, the second pixel, the first comparator and the second comparator may be associated with a same column of the imaging device.

The switch circuit may be configured to operate in a first mode in which the switch circuit connects the first signal line to the first comparator and connects the second signal line to the second comparator, and configured to operate in a second mode in which the switch circuit switches between at least connecting the first signal line to the first comparator and connecting the first signal line to the second comparator.

The imaging device may further comprise a third comparator, wherein the switch circuit is configured to operate in the second mode in which the switch circuit switches between at least connecting the first signal line to the first comparator, connecting the first signal line to the second comparator and connecting the first signal line to the third comparator.

The imaging device may further comprise a third comparator, wherein the first pixel, the second pixel, the first comparator, the second comparator and the third comparator are associated with a same column of the imaging device, wherein the switch circuit is configured to operate in a second mode in which the switch circuit switches between at least connecting the first signal line to the first comparator and connecting the first signal line to the second comparator, and the switch circuit is configured not to connect the first signal line to the third comparator at least when the switch circuit operates in the second mode, based on stored inspection information regarding the third comparator.

The switch circuit may be configured to operate in the second mode in which the switch circuit switches between at least connecting the second signal line to the second comparator and connecting the second signal line to the first comparator.

The first mode may be a parallel mode and the second mode may be a sequential mode.

The first mode may have higher speed than the second mode, and the second mode may have lower power consumption than the first mode.

The first comparator may receive a ramp signal and the second comparator may receive a ramp signal.

The imaging device may further comprise control circuit to control the switch circuit.

The second comparator may be next to the first comparator in the column direction.

Advantageous Effects of Invention

According to one embodiment of the present disclosure, it is possible to suppress deterioration in image quality in a low power consumption mode.

DESCRIPTION OF EMBODIMENTS

Hereinafter, a specific embodiment to which the present technology is applied will be described in detail with reference to the drawings.

<Configuration Example of Imaging Device>

Figure 1:
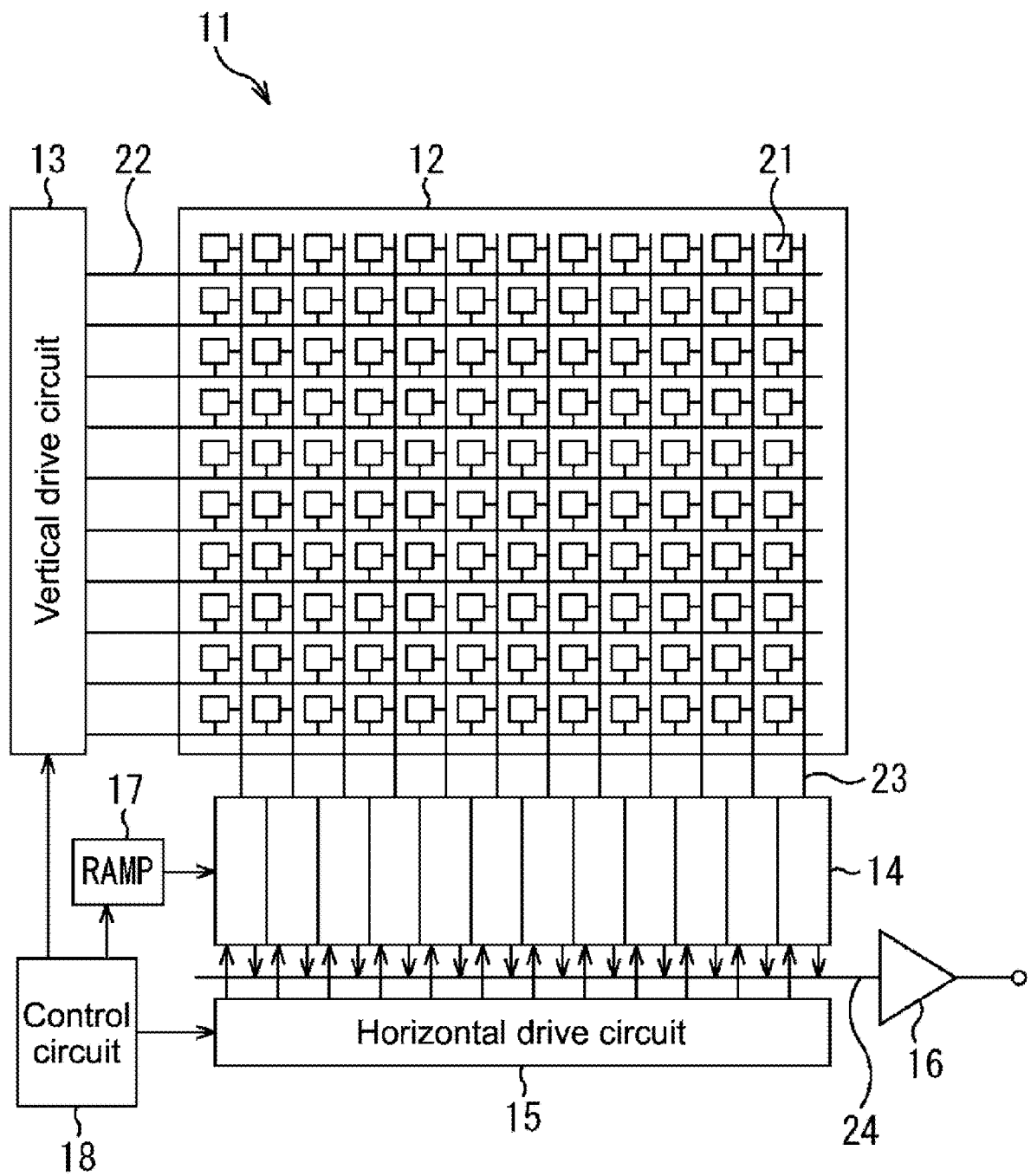
FIG. 1 is a block diagram showing a configuration example of one embodiment of an imaging device to which the present technology is applied.

FIG. 1 is a block diagram showing a configuration example of one embodiment of an imaging device to which the present technology is applied.

As shown in FIG. 1, an imaging device 11 includes a pixel array unit 12, a vertical drive circuit 13, a column signal processing circuit 14, a horizontal drive circuit 15, an output circuit 16, a reference signal generation circuit 17, and a control circuit 18.

The pixel array unit 12 is a light-receiving surface that receives light collected by an optical system (not shown). In the pixel array unit 12, a plurality of pixels 21 are arranged in a matrix. The pixels 21 are connected to the vertical drive circuit 13 via horizontal signal lines 22 on a row-by-row basis and also connected to the column signal processing circuit 14 via vertical signal lines 23 on a column-by-column basis. Each of the pixels 21 outputs an image signal with a level corresponding to the amount of light received. From those image signals, an image of a subject, which is formed on the pixel array unit 12, is created.

The vertical drive circuit 13 supplies a drive signal for driving (transfer, selection, reset, etc.) of each pixel 21 to the pixels 21 via the horizontal signal lines 22 in each row including the pixels 21 arranged in the pixel array unit 12.

The column signal processing circuit 14 performs correlated double sampling (CDS) on the image signals, which are output from the plurality of pixels 21 via the vertical signal lines 23, to thus perform AD conversion of the image signals and also remove reset noise. Further, the column signal processing circuit 14 includes AD conversion circuits in respective columns of the plurality of pixels 21 arranged in a matrix in the pixel array unit 12, and can thus perform AD conversion in parallel on the image signals output from the pixels 21 of the respective columns.

The horizontal drive circuit 15 supplies, to the column signal processing circuit 14, a drive signal for causing the column signal processing circuit 14 to output the image signals from a data output signal line 24, in each column of the pixels 21 arranged in the pixel array unit 12.

The output circuit 16 amplifies the image signals supplied from the column signal processing circuit 14 via the data output signal line 24 at the timing according to the drive signal of the horizontal drive circuit 15, and outputs the resultant signals to a signal processing circuit at a subsequent stage.

The reference signal generation circuit 17 generates a reference signal that is referred to when a comparator 32 of the column signal processing circuit 14 (see FIG. 2) performs AD conversion on image signals. For example, the reference signal generation circuit 17 generates a reference signal with a saw-tooth waveform (RAMP waveform) in which a potential decreases at a constant gradient, and the comparator 32 compares a potential of the image signal and that of the reference signal with each other.

The control circuit 18 generates and supplies, for example, a clock signal according to a drive cycle of each block of the imaging device 11, and thus controls driving of each block. For example, as will be described later with reference to FIGS. 2, 3A, and 3B, in a case where the imaging device 11 is in a low power consumption mode, the control circuit 18 controls a switching unit 31 to sequentially switch between comparators 32, to which the image signals are to be supplied, out of a predetermined number of comparators 32, for use in AD conversion.

Further, the imaging device 11 has the following configuration: the switching unit 31 and the comparator 32 (see FIG. 2) are provided to the AD conversion circuit of the column signal processing circuit 14, the AD conversion circuit being provided to each column of the pixels 21.

For example, the imaging device 11 includes a predetermined number of comparators 32 in each column of the pixels 21 arranged in a matrix in the pixel array unit 12 and can change a connection configuration between the pixels 21 and the comparators 32 by using the switching unit 31. This allows the imaging device 11 to increase an imaging speed or reduce power consumption.

For example, in a connection configuration in which image signals output from the pixels 21 arranged in one column are supplied in parallel to each of the predetermined number of comparators 32, the imaging device 11 can capture an image in a high-speed imaging mode because of parallel driving of the predetermined number of comparators 32. Meanwhile, in a connection configuration in which image signals output from the pixels 21 arranged in one column are successively supplied to any one of the predetermined number of comparators 32, the imaging device 11 can capture an image in the low power consumption mode because the comparators 32 provided in predetermined number perform not parallel driving but sequential AD conversion of the image signals.

Figure 2:
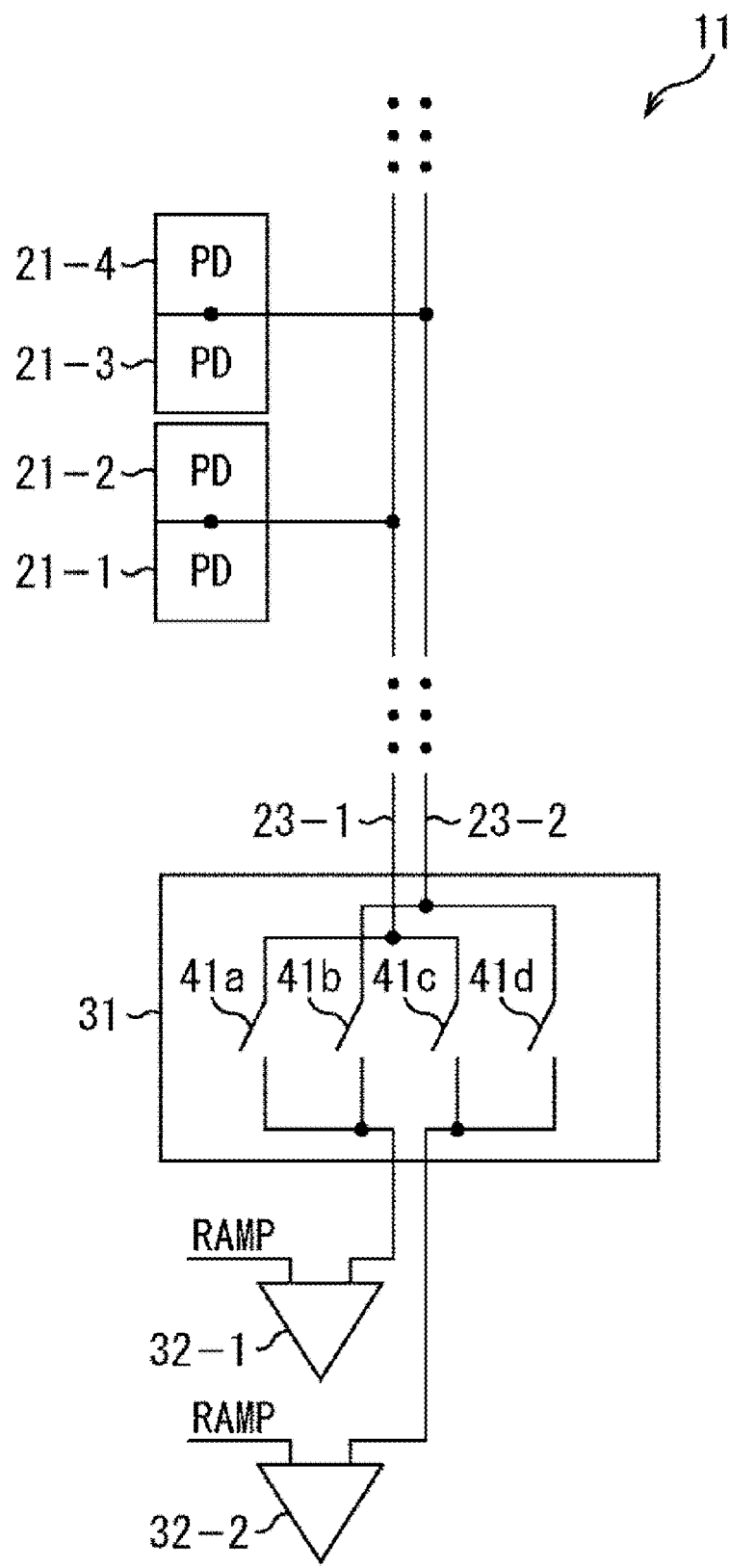
FIG. 2 is a block diagram showing a configuration example of an imaging device including two comparators for pixels in one column.

FIG. 2 shows a configuration example of the imaging device 11 including two comparators 32-1 and 32-2 for the pixels 21 in one column.

Further, FIG. 2 shows four pixels 21-1 to 21-4 out of the pixels 21 arranged in one column. For example, the imaging device 11 can employ a two-pixel sharing structure in which two pixels 21 share elements for outputting image signals, such as a floating diffusion (FD) unit and a transistor. In other words, as shown in FIG. 2, a pair of the pixels 21-1 and 21-2 and a pair of the pixels 21-3 and 21-4 each have a two-pixel sharing structure. It should be noted that the imaging device 11 may employ a pixel sharing structure including two or more pixels.

The imaging device 11 includes two vertical signal lines 23-1 and 23-2 such that image signals can be supplied in parallel to the two comparators 32-1 and 32-2. For example, the pixels 21-1 and 21-2 are connected to the vertical signal line 23-1, and the pixels 21-3 and 21-4 are connected to the vertical signal line 23-2. Thus, the imaging device 11 has a configuration in which the pixels 21 are alternately connected to the vertical signal lines 23-1 and 23-2 at every two rows.

In the imaging device 11, the switching unit 31 is disposed between the vertical signal lines 23-1 and 23-2 and the comparators 32-1 and 32-2. The switching unit 31 can connect the pixels 21-1 to 21-4 and the comparators 32-1 and 32-2 with each other in both the connection configuration in which image signals output from the pixels 21-1 to 21-4 are supplied in parallel to the comparators 32-1 and 32-2 and the connection configuration in which those image signals are successively supplied to the comparator 32-1 or 32-2.

The switching unit 31 includes four switches 41a to 41d connected so as to switch between the comparators 32 to which image signals output from the pixels 21-1 to 21-4 are to be supplied. The switch 41a is disposed between the vertical signal line 23-1 and the comparator 32-1, and the switch 41b is disposed between the vertical signal line 23-2 and the comparator 32-1. Further, the switch 41c is disposed between the vertical signal line 23-1 and the comparator 32-2, and the switch 41d is disposed between the vertical signal line 23-2 and the comparator 32-2. Therefore, the switching unit 31 can connect the pixels 21-1 to 21-4 arranged in one column with both the comparators 32-1 and 32-2.

Therefore, in the imaging device 11, the control circuit 18 of FIG. 1 controls on/off of the switches 41a to 41d of the switching unit 31, so that the image signals output from the pixels 21-1 to 21-4 can be supplies to both or one of the comparators 32-1 and 32-2.

For example, when the imaging device 11 is in the high-speed imaging mode, the switching unit 31 provides a connection configuration in which image signals output via the vertical signal lines 23-1 and 23-2 are supplied in parallel to the comparators 32-1 and 32-2. Therefore, the imaging device 11 performs AD conversion of the image signals with the comparators 32-1 and 32-2 being in an active state in parallel, and can thus shorten time for AD conversion of the image signals to substantially one-half of the time.

Meanwhile, when the imaging device 11 is in the low power consumption mode, the switching unit 31 provides a connection configuration in which image signals output via the vertical signal lines 23-1 and 23-2 are successively supplied to the comparator 32-1 or 32-2. Therefore, the comparators 32-1 and 32-2 are not in an active state in parallel, and the imaging device 11 can reduce power consumption for AD conversion of the image signals by the amount of power of the comparator 32-1 or 32-2 being in a standby state.

In such a manner, when the imaging device 11 is in the low power consumption mode, one of the comparators 32-1 and 32-2 enters an active state, and the other one enters a standby state.

Figure 3:
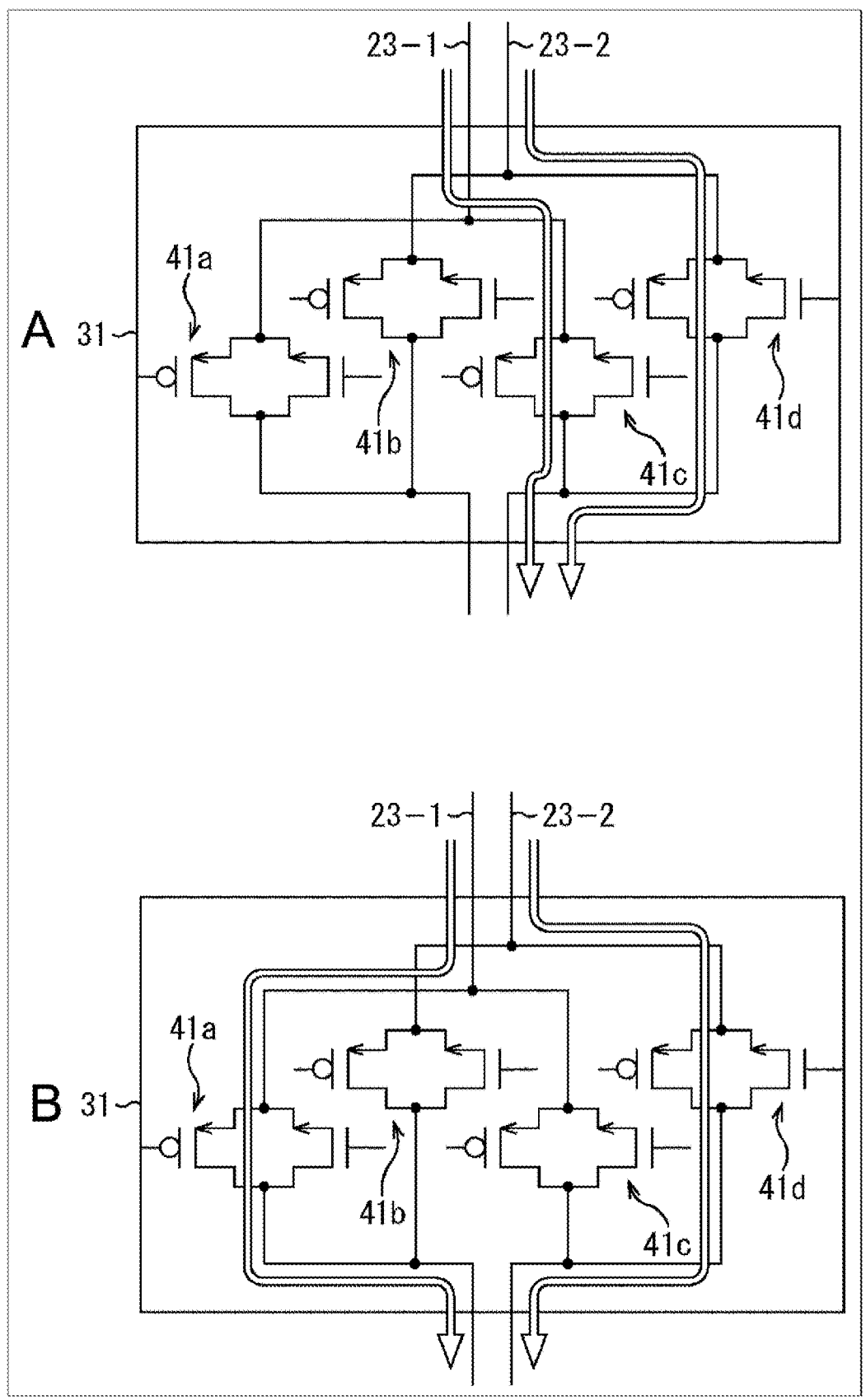
FIG. 3 is a diagram for describing switching of supply of image signals in a low power consumption mode.

Therefore, as shown in FIG. 3A, in the low power consumption mode, the switch 41c is turned on, and image signals output via the vertical signal line 23-1 are supplied to the comparator 32-2. The switch 41d is then turned on, and image signals output via the vertical signal line 23-2 are supplied to the comparator 32-2. In such a manner, since the switching by the switching unit 31 is controlled so as to successively supply the image signals to the comparator 32-2, the imaging device 11 can perform driving in which the comparator 32-2 is constantly in an active state and the comparator 32-1 is constantly in a standby state.

However, as described above, in a case where one comparator 32 is always used for AD conversion of image signals in the low power consumption mode, variations or noise peculiar to that comparator 32 tend to be visible as vertical lines. In this case, there arises a concern about deterioration in image quality.

In this regard, in the imaging device 11, the switching unit 31 is controlled to alternately use the comparators 32-1 and 32-2 for AD conversion of the image signals in the low power consumption mode to alternately switch between the active state and the standby state of the comparators 32-1 and 32-2.

For example, as shown in FIG. 3B, the switch 41a is turned on, and image signals output via the vertical signal line 23-1 are supplied to the comparator 32-1. The switch 41d is then turned on, and image signals output via the vertical signal line 23-2 are supplied to the comparator 32-2. Subsequently, the switch 41b is turned on, and image signals output via the vertical signal line 23-2 are supplied to the comparator 32-1. The switch 41c is then turned on, and image signals output via the vertical signal line 23-1 are supplied to the comparator 32-2.

In such a manner, the imaging device 11 controls the switching unit 31 to alternately supply the image signals to the comparators 32-1 and 32-2, so that the comparators 32-1 and 32-2 alternately repeatedly enter the active state and the standby state. In other words, in the imaging device 11, the comparators 32-1 and 32-2 can repeat AD conversion of the image signals alternately (in a time-division manner).

Therefore, even if the comparators 32-1 and 32-2 have peculiar variations or noise, the imaging device 11 provides an image in which image signals subjected to AD conversion by the comparators 32-1 and 32-2 are alternately arranged. As a result, in the low power consumption mode, the imaging device 11 can avoid making the above-mentioned vertical lines visible (for example, can make the vertical lines less visible as dots) and can suppress deterioration in image quality. For example, the imaging device 11 can suppress negative impacts imparted to images by, in addition to reset noise, noise generated by other principles, and vertical lines to be a fixed pattern generated in the individual comparators 32.

<Another Configuration Example of Imaging Device>

Figure 4:
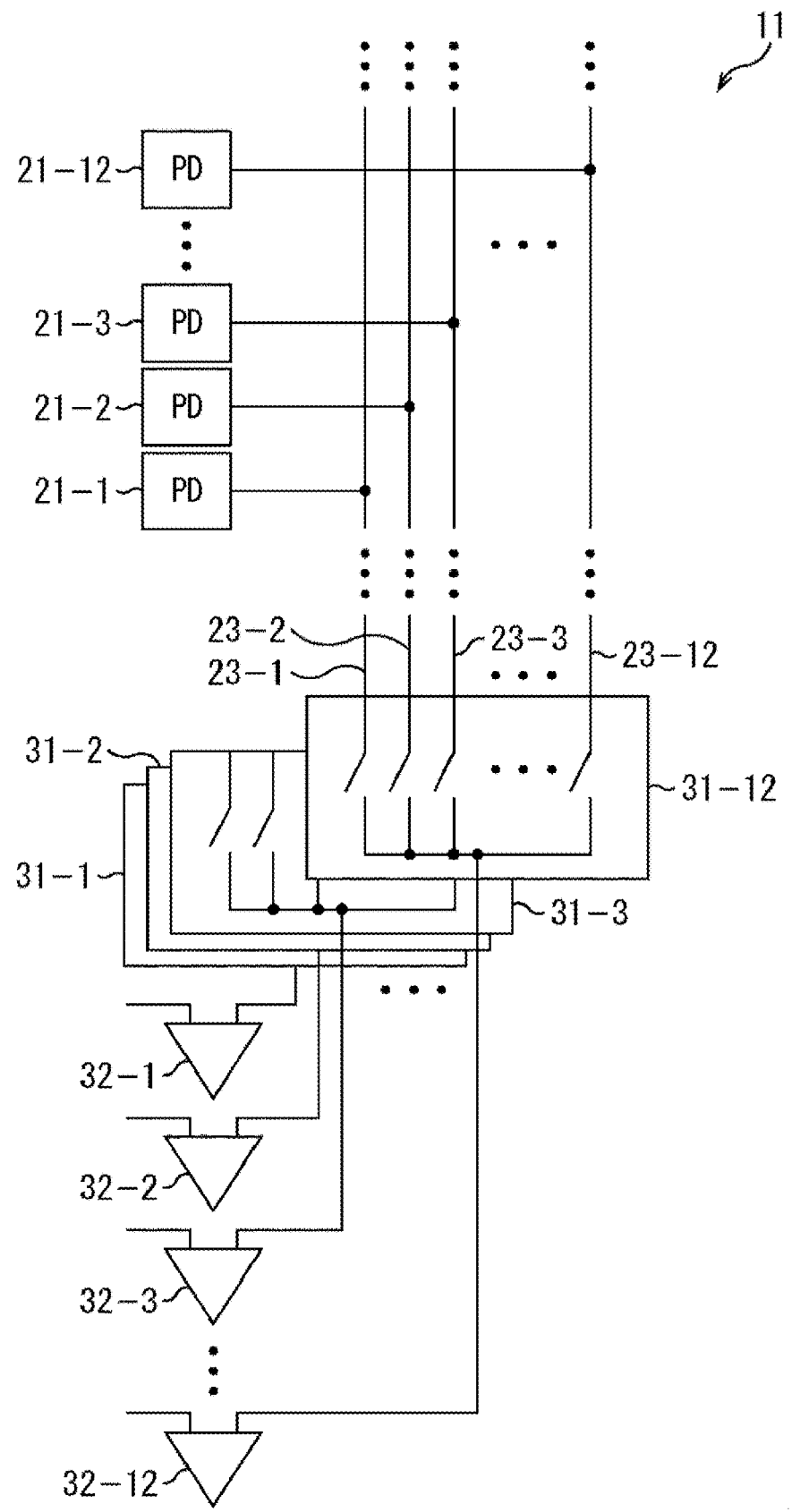
FIG. 4 is a block diagram showing a configuration example of an imaging device that employs 12-parallel AD conversion.

FIG. 4 is a block diagram showing a configuration example of an imaging device 11 that employs 12-parallel AD conversion.

As shown in FIG. 4, the imaging device 11 includes 12 comparators 32 in each column of the pixels 21 arranged in a matrix. It should be noted that the pixels 21 shown in FIG. 4 do not employ the pixel sharing structure, and 12 pixels 21-1 to 21-12 are respectively connected to 12 vertical signal lines 23-1 to 23-12. Additionally, 12 switching units 31-1 to 31-12 are disposed between the 12 vertical signal lines 23-1 to 23-12 and the 12 comparators 32-1 to 32-12.

For example, the switching unit 31-1 connects the vertical signal lines 23-1 to 23-12 with the comparator 32-1, and the switching unit 31-2 connects the vertical signal lines 23-1 to 23-12 with the comparator 32-2. Hereinafter, similarly, the switching unit 31-12 connects the vertical signal lines 23-1 to 23-12 with the comparator 32-12. Therefore, the switching units 31-1 to 31-12 can optionally connect the pixels 21 arranged in one column with all the comparators 32-1 to 32-12.

For example, when the imaging device 11 is in the high-speed imaging mode, the switching units 31-1 to 31-12 provide a connection configuration in which image signals output via the vertical signal lines 23-1 to 23-12 are supplied to the comparators 32-1 to 32-12 in parallel. Therefore, the imaging device 11 performs AD conversion of the image signals with the comparators 32-1 to 32-12 being in an active state in parallel, and can thus shorten time for AD conversion of the image signals to substantially twelfth part of the time.

Meanwhile, when the imaging device 11 is in the low power consumption mode, the switching units 31-1 to 31-12 provide a connection configuration in which image signals output via the vertical signal lines 23-1 to 23-12 are successively supplied to any one of the comparators 32-1 to 32-12. Therefore, any one of the comparators 32-1 to 32-12 enters the active state to perform AD conversion of the image signals, and the imaging device 11 can reduce power consumption for AD conversion of the image signals.

In the low power consumption mode, the imaging device 11 can repeatedly sequentially use any one of the comparators 32-1 to 32-12 for AD conversion of the image signals. Therefore, as described above, the imaging device 11 can suppress deterioration in image quality in the low power consumption mode.

<Configuration Example of Imaging Device Having Laminated Structure>

Figure 5:
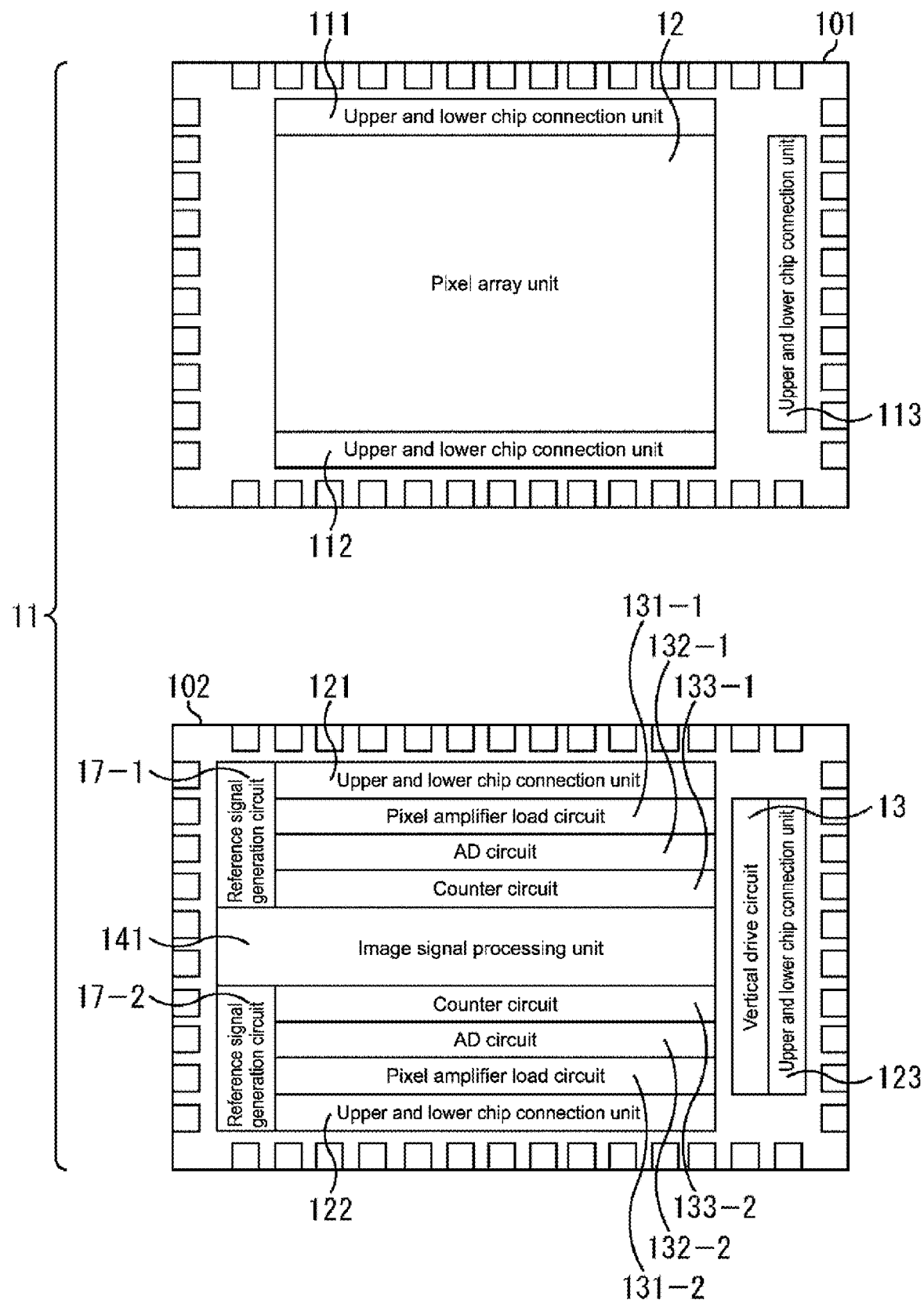
FIG. 5 is a diagram showing a configuration example of an imaging device having a laminated structure.

FIG. 5 shows a configuration example of an imaging device 11 having a laminated structure.

As shown in FIG. 5, the imaging device 11 can have a laminated structure in which a sensor circuit chip 101 and a logic circuit chip 102 are laminated.

In the sensor circuit chip 101, upper and lower chip connection units 111 to 113 are formed together with the pixel array unit 12 in which the pixels 21 are arranged in a matrix as shown in FIG. 1. The upper and lower chip connection units 111 to 113 are provided with a plurality of contact portions for electrically connecting the sensor circuit chip 101 and the logic circuit chip 102 to each other.

For example, the sensor circuit chip 101 can output an image signal from the pixel array unit 12 to the logic circuit chip 102 via both the upper and lower chip connection unit 111 and the upper and lower chip connection unit 112 respectively provided on the upper side and the lower side of the pixel array unit 12. Further, the sensor circuit chip 101 can supply a drive signal from the logic circuit chip 102 to the pixel array unit 12 via the upper and lower chip connection unit 113 provided on a lateral side of the pixel array unit 12.

In the logic circuit chip 102, the vertical drive circuit 13 and reference signal generation circuits 17-1 and 17-2 of FIG. 1 are formed. Further, pixel amplifier load circuits 131-1 and 131-2, AD circuits 132-1 and 132-2, and counter circuits 133-1 and 133-2 formed in the logic circuit chip 102 constitute the column signal processing circuit 14 of FIG. 1.

Further, in the logic circuit chip 102, upper and lower chip connection units 121 to 123 are formed at positions corresponding to the upper and lower chip connection units 111 to 113 of the sensor circuit chip 101, and corresponding contact portions between the corresponding upper and lower chip connection units are subjected to metal joining. Furthermore, the logic circuit chip 102 includes an image signal processing unit 141 that performs various types of signal processing for image signals output from the pixel array unit 12.

In the imaging device 11 thus configured, the switching unit 31 and the comparators 32 (see FIG. 2 or FIG. 4 described above) can be mounted at optional positions, for example, mounted at the AD circuits 132-1 and 132-2, respectively. Alternatively, the switching unit 31 and the comparators 32 may be mounted to the sensor circuit chip 101.

In the low power consumption mode, the imaging device 11 controls switching of the comparators 32 to which image signals are supplied via the switching unit 31, and can thus avoid making the above-mentioned vertical lines visible and can suppress deterioration in image quality.

It should be noted that for example, the imaging device 11 may employ a three-layer structure in which memory chips (not shown) are laminated, the memory chips temporarily holding images captured at high speed before outputting those images to an external device.

<Selective Use of Comparators>

Selective use of the comparators 32 will be described with reference to FIGS. 6A and 6B.

As described above, when the imaging device 11 is in the low power consumption mode, the control circuit 18 performs control to sequentially switch between the comparators 32 to which image signals are supplied, out of the predetermined number of comparators 32, for use in AD conversion. At that time, the control circuit 18 does not use all the predetermined number of comparators 32 for AD conversion of image signals, but the control circuit 18 can select only optional comparators 32 for use in AD conversion.

For example, in an inspection step of manufacturing the imaging device 11, characteristics of all the comparators 32 formed in the column signal processing circuit 14 are inspected. As a result, information on a comparator 32 having poor characteristics is stored in, for example, a one-time programmable read only memory (OTP ROM). When the imaging device 11 is in the low power consumption mode, the control circuit 18 does not use the comparator 32, the information of poor characteristics of which is stored, for AD conversion of image signals, but can selectively use a comparator 32, which is previously determined as having good characteristics, for AD conversion of image signals.

For example, a case where the comparator 32-2 out of the four comparators 32-1 to 32-4 has poor characteristics will be described with reference to FIGS. 6A and 6B.

Figure 6:
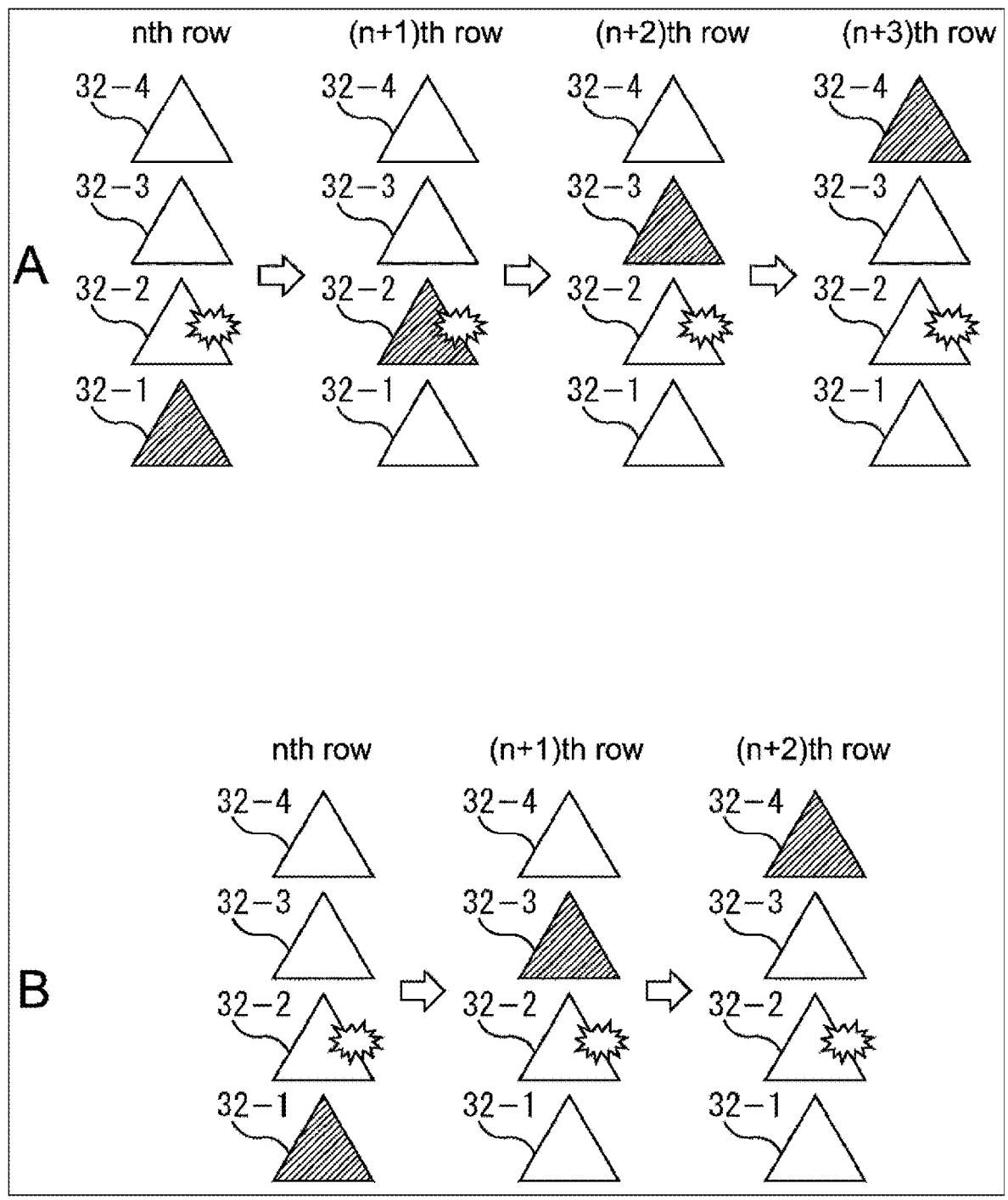
FIG. 6 is a diagram for describing a configuration for selectively using comparators.

As shown in FIG. 6A, the four comparators 32-1 to 32-4 are all used for AD conversion. When image signals are sequentially supplied to the four comparators 32-1 to 32-4, the comparator 32-2 having poor characteristics performs AD conversion on the image signals at every 4 rows of the pixels 21. In this case, the vertical lines as described above are not made visible in an image, but noise generated in the image signals, which are subjected to AD conversion by the comparator 32-2, is viewed as a dotted line.

In contrast to the above, as shown in FIG. 6B, out of the four comparators 32-1 to 32-4, the comparator 32-1, the comparator 32-3, and the comparator 32-4 are selectively used to thus avoid AD conversion of the image signals by the comparator 32-2. Therefore, in this case, noise as shown in FIG. 6A is not generated in the image signals, and image quality of the image can thus be improved.

In such a manner, the control circuit 18 selectively uses the comparator 32-1, the comparator 32-3, and the comparator 32-4, each of which has good characteristics, for AD conversion of image signals. Thus, the imaging device 11 can capture an image with higher image quality.

It should be noted that the imaging device 11 as described above can be applied to various electronic apparatuses including, for example, imaging systems such as a digital still camera and a digital video camera, a mobile phone having an imaging function, and other devices having an imaging function.

<Configuration Example of Imaging Apparatus>

Figure 7:
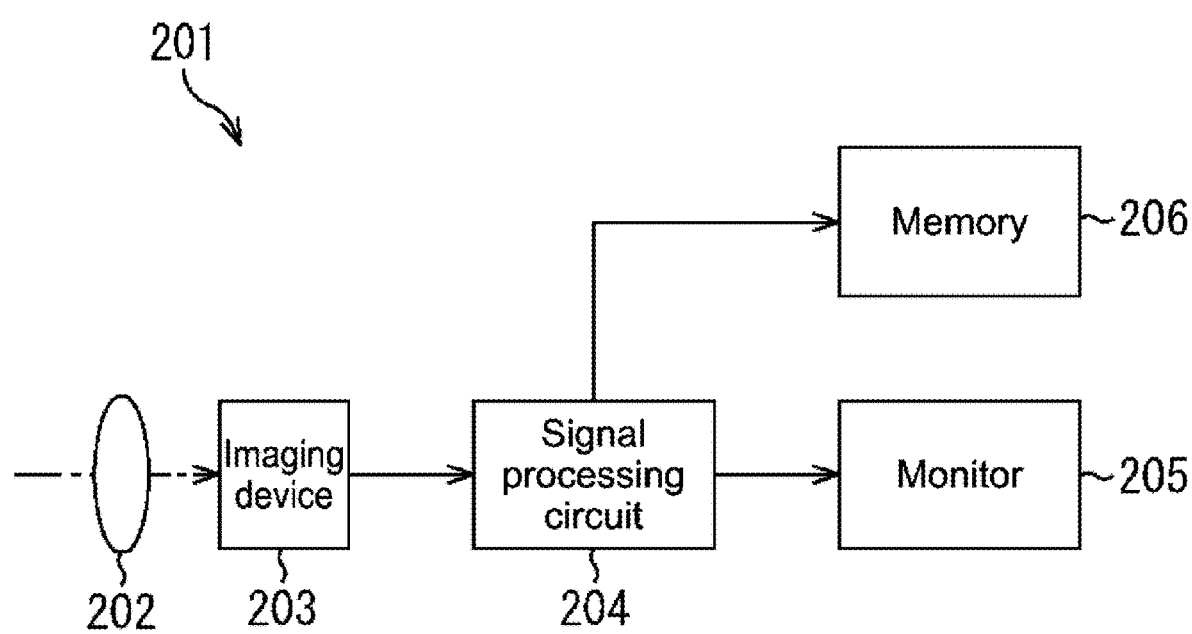
FIG. 7 is a block diagram showing a configuration example of an imaging apparatus.

FIG. 7 is a block diagram showing a configuration example of an imaging apparatus mounted to an electronic apparatus.

As shown in FIG. 7, an imaging apparatus 201 includes an optical system 202, an imaging device 203, a signal processing circuit 204, a monitor 205, and a memory 206 and can capture still images and moving images.

The optical system 202 includes one or more lenses. The optical system 202 guides image light (incident light) coming from a subject to the imaging device 203 and forms an image on a light-receiving surface (sensor unit) of the imaging device 203.

The imaging device 11 described above is applied to the imaging device 203. The imaging device 203 accumulates electrons for a certain period of time in accordance with an image formed on the light-receiving surface via the optical system 202. A signal corresponding to the electrons accumulated in the imaging device 203 is supplied to the signal processing circuit 204.

The signal processing circuit 204 performs various types of signal processing on an image signal output from the imaging device 203. An image (image data) obtained when the signal processing circuit 204 performs signal processing is supplied to the monitor 205 for display or supplied to the memory 206 for storage (recording).

The imaging device 11 as described above is applied to the imaging apparatus 201 thus configured, and it is thus possible to suppress deterioration in image quality in, for example, the low power consumption mode and capture an image with higher image quality.

<Usage Example of Image Sensor>

Figure 8:
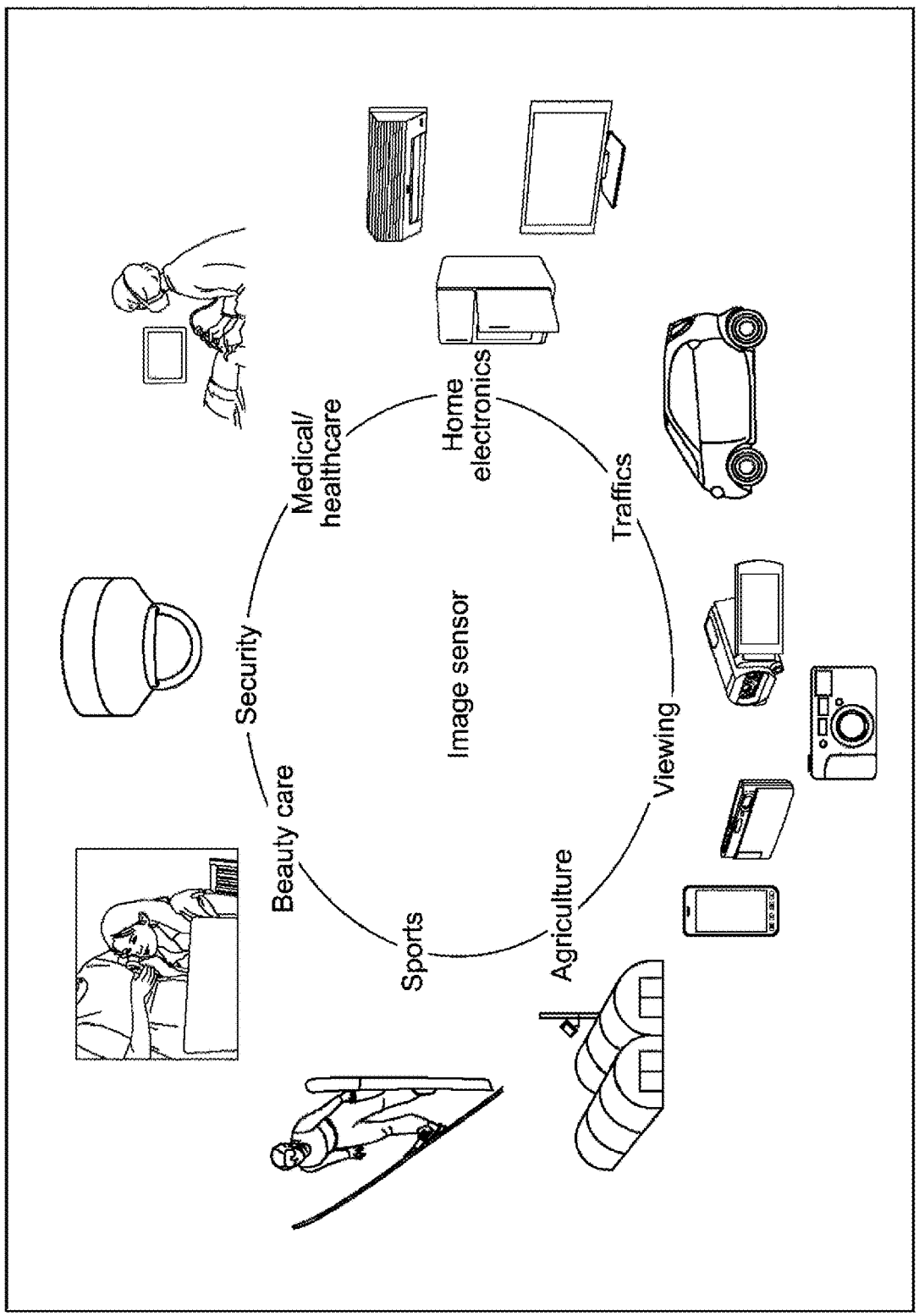
FIG. 8 is a diagram showing a usage example that uses an image sensor.

FIG. 8 is a diagram showing a usage example that uses the image sensor described above.

The image sensor described above can be used in various cases of sensing light such as visible light, infrared light, ultraviolet light, and X-rays as follows.

An apparatus for photographing images to be viewed, such as a digital camera and a camera-equipped mobile apparatus An apparatus used for traffic purposes, such as a car-mounted sensor that photographs front/rear/periphery/inside of an automobile, a surveillance camera that monitors running vehicles and roads, and a distance measurement sensor that measures distances among vehicles, for safe driving including automatic stop, recognition of a driver's state, and the like An apparatus used in home electronics such as a TV, a refrigerator, and an air conditioner, for photographing gestures of users and executing apparatus operations according to the gestures An apparatus used for medical and healthcare purposes, such as an endoscope and an apparatus that performs blood vessel photographing by receiving infrared light An apparatus used for security purposes, such as a surveillance camera for crime-prevention purposes and a camera for person authentication purposes An apparatus used for beauty care purposes, such as a skin measurement apparatus that photographs skins and a microscope that photographs scalps An apparatus used for sports purposes, such as an action camera and a wearable camera for sports purposes An apparatus for agriculture purposes, such as a camera for monitoring a state of fields and crops It should be noted that the present technology can have the following configurations.

(1)
A solid-state imaging device, including:
a predetermined number of comparators that are provided in each column of a plurality of pixels arranged in a matrix and compare an image signal output from each of the pixels and a reference signal when the image signal is subjected to analog-to-digital (AD) conversion; and
a switching unit that is capable of connecting the plurality of pixels of each column and all of the predetermined number of comparators to each other and switching between the comparators to which the image signals are to be supplied, both in a connection configuration in which the image signals output from the plurality of pixels arranged in each column are supplied in parallel to the predetermined number of comparators and in a connection configuration in which the image signals are successively supplied to any one of the predetermined number of comparators.

(2)
The solid-state imaging device according to (1), further including
a control unit that controls the switching unit to sequentially switch between the comparators to which the image signals are to be supplied, out of the predetermined number of comparators, for use in the AD conversion in a mode in which the image signals are successively subjected to the AD conversion.

(3)
The solid-state imaging device according to (2), in which the control unit selectively uses a comparator previously determined as having good characteristics, out of the predetermined number of comparators, for the AD conversion of the image signal.

(4)
The solid-state imaging device according to any one of (1) to (3), further including a column-parallel AD conversion processing unit that performs the AD conversion in parallel on the image signals output from the plurality of pixels of each column, the column-parallel AD conversion processing unit including the predetermined number of comparators and the switching unit in each column of the plurality of pixels.

(5)
The solid-state imaging device according to any one of (1) to (4), in which the plurality of pixels have a pixel sharing structure in which the plurality of pixels share an element for outputting the image signals.

(6)
The solid-state imaging device according to any one of (1) to (5), which has a laminated structure in which a sensor circuit chip and a logic circuit chip are laminated, the sensor circuit chip including the plurality of pixels, the logic circuit chip including a circuit for driving the plurality of pixels.

(7)
A control method for a solid-state imaging device, the solid-state imaging device including
a predetermined number of comparators that are provided in each column of a plurality of pixels arranged in a matrix and compare an image signal output from each of the pixels and a reference signal when the image signal is subjected to analog-to-digital (AD) conversion, and
a switching unit that is capable of connecting the plurality of pixels of each column and all of the predetermined number of comparators to each other and switching between the comparators to which the image signals are to be supplied, both in a connection configuration in which the image signals output from the plurality of pixels arranged in each column are supplied in parallel to the predetermined number of comparators and in a connection configuration in which the image signals are successively supplied to any one of the predetermined number of comparators, the control method including
controlling the switching unit to sequentially switch between the comparators to which the image signals are to be supplied, out of the predetermined number of comparators, for use in the AD conversion in a mode in which the image signals are successively subjected to the AD conversion.

(8)
An electronic apparatus, including
a solid-state imaging device including
a predetermined number of comparators that are provided in each column of a plurality of pixels arranged in a matrix and compare an image signal output from each of the pixels and a reference signal when the image signal is subjected to analog-to-digital (AD) conversion, and
a switching unit that is capable of connecting the plurality of pixels of each column and all of the predetermined number of comparators to each other and switching between the comparators to which the image signals are to be supplied, both in a connection configuration in which the image signals output from the plurality of pixels arranged in each column are supplied in parallel to the predetermined number of comparators and in a connection configuration in which the image signals are successively supplied to any one of the predetermined number of comparators.

(9)
An imaging device, comprising:
a plurality of pixels arranged in rows and columns, the plurality of pixels including a first pixel and a second pixel;
a first signal line coupled to the first pixel;
a second signal line coupled to the second pixel;
a first comparator;
a second comparator displaced from the first comparator in a column direction; and a switch circuit configured to couple the first signal line to the first comparator and the second comparator, and couple the second signal line to the first comparator and the second comparator.

(10)
The imaging device according to claim (9), wherein the second pixel is adjacent to the first pixel.

(11)
The imaging device according to claim (9), wherein the first pixel includes a plurality of photoelectric conversion elements.

(12)

The imaging device according to claim (9), wherein the second pixel includes a plurality of photoelectric conversion elements.

(13)
The imaging device according to claim (9), wherein the first pixel, the second pixel, the first comparator and the second comparator are associated with a same column of the imaging device.

(14)
The imaging device according to claim (9), wherein the switch circuit is configured to operate in a first mode in which the switch circuit connects the first signal line to the first comparator and connects the second signal line to the second comparator, and configured to operate in a second mode in which the switch circuit switches between at least connecting the first signal line to the first comparator and connecting the first signal line to the second comparator.

(15)
The imaging device according to claim (14), further comprising a third comparator, wherein the switch circuit is configured to operate in the second mode in which the switch circuit switches between at least connecting the first signal line to the first comparator, connecting the first signal line to the second comparator and connecting the first signal line to the third comparator.

(16)
The imaging device of claim (14), further comprising a third comparator, wherein the first pixel, the second pixel, the first comparator, the second comparator and the third comparator are associated with a same column of the imaging device, wherein the switch circuit is configured to operate in a second mode in which the switch circuit switches between at least connecting the first signal line to the first comparator and connecting the first signal line to the second comparator, and the switch circuit is configured not to connect the first signal line to the third comparator at least when the switch circuit operates in the second mode, based on stored inspection information regarding the third comparator.

(17)
The imaging device of claim (14), wherein the switch circuit is configured to operate in the second mode in which the switch circuit switches between at least connecting the second signal line to the second comparator and connecting the second signal line to the first comparator.

(18)
The imaging device of claim (14), wherein the first mode is a parallel mode and the second mode is a sequential mode.

(19)
The imaging device of claim (18), wherein the first mode has higher speed than the second mode, and the second mode has lower power consumption than the first mode.

(20)
The imaging device of claim (9), wherein the first comparator receives a ramp signal and the second comparator receives a ramp signal.

(21)
The imaging device of claim (9), further comprising a control circuit to control the switch circuit.

(22)
The imaging device of claim (9), wherein the second comparator is next to the first comparator in the column direction.

It should be noted that this embodiment is not limited to the embodiment described above and can be variously modified without departing from the gist of the present disclosure.

REFERENCE SIGNS LIST 11 imaging device
12 pixel array unit
13 vertical drive circuit
14 column signal processing circuit
15 horizontal drive circuit
16 output circuit
17 reference signal generation circuit
18 control circuit
21 pixel
22 horizontal signal line
23 vertical signal line
24 data output signal line
31 switching unit
32 comparator
41a to 41d switch

The invention claimed is:

1. An imaging device, comprising:
a plurality of pixels arranged in rows and columns, the plurality of pixels including a first pixel and a second pixel;
a first signal line coupled to the first pixel;
a second signal line coupled to the second pixel;
a first comparator;
a second comparator displaced from the first comparator in a column direction; and
a switch circuit configured to couple the first signal line to the first comparator and the second comparator, and couple the second signal line to the first comparator and the second comparator,
wherein the switch circuit is configured to operate in a first mode in which the switch circuit connects the first signal line to the first comparator and connects the second signal line to the second comparator, and configured to operate in a second mode in which the switch circuit switches between at least connecting the first signal line to the first comparator and connecting the first signal line to the second comparator.

2. The imaging device according to claim 1, wherein the second pixel is adjacent to the first pixel.

3. The imaging device according to claim 1, wherein the first pixel includes a plurality of photoelectric conversion elements.

4. The imaging device according to claim 1, wherein the second pixel includes a plurality of photoelectric conversion elements.

5. The imaging device according to claim 1, wherein the first pixel, the second pixel, the first comparator and the second comparator are associated with a same column of the imaging device.

6. The imaging device according to claim 1, further comprising a third comparator, wherein the switch circuit is configured to operate in the second mode in which the switch circuit switches between at least connecting the first signal line to the first comparator, connecting the first signal line to the second comparator and connecting the first signal line to the third comparator.

7. The imaging device of claim 1, further comprising a third comparator, wherein the first pixel, the second pixel, the first comparator, the second comparator and the third comparator are associated with a same column of the imaging device, wherein the switch circuit is configured to operate in a second mode in which the switch circuit switches between at least connecting the first signal line to the first comparator and connecting the first signal line to the second comparator, and the switch circuit is configured not to connect the first signal line to the third comparator at least when the switch circuit operates in the second mode, based on stored inspection information regarding the third comparator.

8. The imaging device of claim 1, wherein the switch circuit is configured to operate in the second mode in which the switch circuit switches between at least connecting the second signal line to the second comparator and connecting the second signal line to the first comparator.

9. The imaging device of claim 1, wherein the first mode is a parallel mode and the second mode is a sequential mode.

10. The imaging device of claim 9, wherein the first mode has higher speed than the second mode, and the second mode has lower power consumption than the first mode.

11. The imaging device of claim 1, wherein the first comparator receives a ramp signal and the second comparator receives a ramp signal.

12. The imaging device of claim 1, further comprising a control circuit to control the switch circuit.

13. The imaging device of claim 1, wherein the second comparator is next to the first comparator in the column direction.

* * * * *